UNITED STATES PATENT OFFICE.

EBEN DOWIE, OF MONTREAL, QUEBEC, CANADA.

PROCESS FOR THE TREATMENT OF WOOL-COMBERS' EFFLUENTS.

No. 892,370.   Specification of Letters Patent.   Patented June 30, 1908.

Application filed December 4, 1907. Serial No. 405,100.

*To all whom it may concern:*

Be it known that I, EBEN DOWIE, a subject of the King of Great Britain, resident of 223 Commissioners street, in the city of Montreal, in the district of Montreal, in the Province of Quebec, in the Dominion of Canada, have invented certain new and useful Improvements in Processes for the Treatment of Wool-Combers' Effluents, of which the following is a specification.

The invention relates to a process for the treatment of wool combers' effluents, as set forth in the present specification and particularly pointed out in the claims.

It is well known in the treatment of wool combers' effluents to use sulfuric acid to crack the suds and thus secure the magma, but in this treatment the alkali is destroyed and the fatty matters recovered are largely converted into free fatty acid. Further, treatments by sulfuric acid and other known methods are expensive, therefore the processes cannot be considered as commercially valuable, thus rendering the said processes only valuable in so far as they save the pollution of rivers and other waters in wool combers' vicinity.

The present invention has for its objects the elimination of the nuisances created by the pollution of rivers and other waters in the wool combers' vicinity and particularly the saving of the alkali and the conversion of the same into a commercial commodity and incidentally the liberation and saving of the fatty matters free from the fatty acids and of the fatty acids as well in fact generally-speaking perfect separation and recovery of the ingredients making up the effluents at a moderate cost.

The process consists first in adding to the effluents, contained in a suitable receptacle, a carbohydrate, such as molasses, sugar, glucose, starch, residues from beet sugar or cane sugar plantations, then stirring up the effluents with the carbohydrate therein by beating, churning or driving air or steam therethrough and thus securing the magma at the top thereof. The effect of the said agitation is the liberation of the fatty matters and fatty acids from the main body leaving, a substance, which may be broadly termed as sucrate of potash or sucrate of lime, though, of course this sucrate of potash or sucrate of lime is largely combined with water.

The magma formed at the top of the body carries with it a large percentage of the liquid containing the sucrate of potash and is skimmed or floated off for further treatment. The sucrate of potash remaining thus freed from the fat is evaporated in any approved evaporator until it is brought to the desired density for commercial use as a dust layer, or is further incinerated and rendered of commercial use as carbonate of potash.

The magma may be treated in various ways, though preferably it is passed into a tank and if necessary treated with a carbohydrate and boiled for a certain time and then drained into a heated chamber or chambers, the temperature of which is maintained at a predetermined degree of heat, until the various substances arrange themselves according to their specific gravity, the pure wool fat rises to the top, fatty acids next, the sucrate of potash combined with the water next, and the mud or dirt at the bottom. The substances are then drained off and it will be found that the wool fat and the fatty acids are distinctly apart, but if it is required to have the wool fat chemically and absolutely pure, it may be made into an emulsion by potash and water or other alkali and water and again treated with a carbohydrate and finally left to settle in a heated chamber, as described.

The sucrate of potash, as is well known, has the property of remaining almost for an indefinite period in its wet state, that is to say, it will not dry up, consequently by this process, the converted alkali of the effluents, namely the sucrate of potash as a commercial commodity is particularly valuable for dust laying and as it is obtained at a very moderate cost.

The steps in the present treatment may be varied to some extent and one or other of them may be omitted, if it is found desirable so to do, but the maintaining of the treated magma at a fairly high temperature during settling will always be an essential feature in one part of the process, while the use of a carbohydrate, as an agent for the purpose of freeing the alkali from the fatty matters and fatty acids and converting it into a sucrate of potash, will always be an important feature in the first part of my process.

It must be understood that while the carrying out of the process in its entirety includes the two steps, namely, the cracking of the suds or the treating of the magma or both by a carbohydrate and the settling of the boiled liquid at a fairly high temperature, or in other words, in a heated chamber or chambers, either of these important steps may be used in connection with other treatments varying in the steps from that which is fully set forth herein, that is to say, the effluents may be treated with a carbohydrate and the treatment of magma and the sucrate of potash solution continued in any suitable way and again the effluents may be treated with another agent performing somewhat like results and the treatment continued by maintaining the treated matter in a heated chamber or chambers for a sufficient time to allow the substances to arrange themselves according to their specific gravity.

In lieu of such gravity separation in heated settling chambers, mechanical separation by means of the well known centrifugal machines may in some cases be employed to attain a speedier result.

The effluents may not always be treated in the first place with a carbohydrate, but simply churned or beaten up so that the magma is formed and then the magma treated with a carbohydrate, or further, sufficient carbohydrate may be introduced into the effluents in the first place without it being necessary to add further carbohydrate to the magma, these are details in the working out of the process.

What I claim as my invention is:

1. The herein described process of treating wool combers' effluents, consisting in first adding a carbohydrate to the effluents and agitating said effluents and carbohydrate, then removing the magma caused by said agitation and heating to boiling point said magma and finally maintaining the liquid at a definite temperature for a period of time and allowing the various substances to arrange themselves according to their specific gravity, as specified.

2. The herein described process of treating wool combers' effluents consisting in first adding a carbohydrate to a quantity of the effluents and agitating said effluents and carbohydrate and forming by such action a magma floating on top of the liquid, then boiling said magma and treating the same with carbohydrate and finally draining off the boiling liquid and maintaining it at a predetermined temperature for a period of time and allowing the various substances to arrange themselves according to their specific gravity, as specified.

3. In a process for the treatment of wool combers' effluents, the addition of a carbohydrate to the effluents and subsequent agitation, as specified.

4. The herein described process of treating wool combers' effluents consisting in agitating a quantity of the effluents and forming a magma and adding to that magma a carbohydrate and boiling the said magma and carbohydrate and maintaining the temperature of said liquid subsequent to boiling at a temperature slightly below boiling point during the period that the various substances take to arrange themselves according to their specific gravity, as specified.

5. The herein described process of treating wool combers' effluents consisting in treating the effluents with a suitable separating agent and securing a magma and boiling said magma and maintaining artificially the liquid subsequent to boiling at a predetermined temperature slightly below boiling point during the period of settling, as specified.

6. The herein described process of treating wool combers' effluents, consisting in the addition to the effluents of a carbohydrate, the agitation of said effluents with the carbohydrate therein, the withdrawal of the fatty matters liberated by the treatment of said carbohydrate and the evaporation of the remaining liquid to a suitable density, as specified.

7. As a composition of matter, a dust laying substance composed of a carbohydrate, sucrate of potash, wool fat and free fatty acid in the proportions determined by the action of the carbohydrate on the effluents and subsequent settling.

Signed at the city and district of Montreal, in the Province of Quebec, in the Dominion of Canada, this second day of December, 1907.

EBEN DOWIE

Witnesses:
G. H. TRESIDDER,
P. SHEE.